(12) United States Patent
Ditzel et al.

(10) Patent No.: US 10,145,442 B2
(45) Date of Patent: Dec. 4, 2018

(54) VIBRATION ABSORBER

(71) Applicant: Anvis Deutschland GmbH, Steinau an der Strasse (DE)

(72) Inventors: Joerg Ditzel, Freigericht (DE); Sebastian Boes, Brachttal (DE)

(73) Assignee: Anvis Deutschland GmbH (DE)

( * ) Notice: Subject to any disclaimer, the term of this patent is extended or adjusted under 35 U.S.C. 154(b) by 0 days.

(21) Appl. No.: 15/420,299

(22) Filed: Jan. 31, 2017

(65) Prior Publication Data

US 2017/0227084 A1 Aug. 10, 2017

(30) Foreign Application Priority Data

Feb. 10, 2016 (DE) .................. 10 2016 001 507

(51) Int. Cl.
*F16M 5/00* (2006.01)
*F16F 13/14* (2006.01)
*F16F 7/108* (2006.01)

(52) U.S. Cl.
CPC .............. *F16F 13/14* (2013.01); *F16F 7/108* (2013.01); *F16F 2222/08* (2013.01); *F16F 2224/025* (2013.01)

(58) Field of Classification Search
CPC ........ F16F 13/14; F16F 13/16; F16F 13/1409; F16M 5/00; F16M 11/00; F16M 13/00
USPC ................ 267/140.12, 140.13, 140.2–140.5, 267/141.1–141.7
See application file for complete search history.

(56) References Cited

U.S. PATENT DOCUMENTS

| | | | | |
|---|---|---|---|---|
| 4,032,202 A | * | 6/1977 | Ishikawa .................. | B60G 7/00 267/280 |
| 4,848,756 A | * | 7/1989 | Funahashi ............... | F16F 13/14 267/140.12 |
| 4,951,930 A | * | 8/1990 | Uno ........................ | B60G 99/00 267/141.2 |
| 5,123,633 A | * | 6/1992 | Kanda ..................... | F16F 13/14 267/140.11 |
| 5,299,788 A | * | 4/1994 | Kanda ..................... | F16F 13/14 267/140.12 |
| 5,718,407 A | * | 2/1998 | Lee ......................... | F16F 1/3842 180/312 |

(Continued)

FOREIGN PATENT DOCUMENTS

| | | |
|---|---|---|
| DE | 691 01 803 | 11/1994 |
| DE | 103 59 340 | 7/2005 |
| DE | 103 59 343 | 7/2005 |

OTHER PUBLICATIONS

German Examination Report of Dec. 12, 2016.

*Primary Examiner* — Christopher P Schwartz
(74) *Attorney, Agent, or Firm* — Gerald E. Hespos; Michael J. Porco; Matthew T. Hespos

(57) ABSTRACT

A vibration absorber (1) with radially acting hydraulic damping has a bearing core (2). A bearing cage (4) radially surrounding the bearing core (2) and an elastomer body (18) resiliently connects the bearing core (2) and the bearing cage (4). An outer sleeve (24) radially surrounds the elastomer body (18) for connection to an absorber mass (40). At least two working chambers (28) to be filled with a damping fluid are formed in the elastomer body (18). The working chambers (28) are connected fluidically to one another by means of a dimensionally stable fluid duct (26).

13 Claims, 12 Drawing Sheets

(56) References Cited

U.S. PATENT DOCUMENTS

| | | | | |
|---|---|---|---|---|
| 5,918,864 A | * | 7/1999 | Schafer | F16F 13/1409 267/140.12 |
| 7,441,757 B2 | * | 10/2008 | Siemer | 267/140.12 |
| 7,866,639 B2 | * | 1/2011 | Endo | F16F 13/14 267/140.12 |
| 8,087,647 B2 | * | 1/2012 | Endo | F16F 13/1409 267/140.12 |

* cited by examiner

VIBRATION ABSORBER

BACKGROUND

1. Field of the Invention

The present invention relates to a vibration absorber with a radially acting hydraulic damping for axial fastening.

2. Description of the Related Art

Resonant vibrations of structures and components, for example in motor vehicles, are damped with vibration absorbers that usually are designed as a damped spring/mass system. However, when such a vibration absorber is used, excessive increases (sidebands) occur below and above the resonant frequency and must be reduced by means of a correspondingly designed damping.

Known radially acting vibration absorbers provide this damping by means of fillers in the elastomer mixture. However, filled elastomers have the property of reacting to different excitation amplitudes with differing rigidity. This effect, also referred to as the "Payne effect", requires that conventional radial vibration absorbers only have a satisfactory action in a narrow excitation band.

Furthermore, axially acting hydraulic vibration absorbers are known which, however, because of their structural design only allow very low manufacturing tolerances. These vibration absorbers do not act in the radial direction.

Furthermore, radially acting vibration absorbers are known from the prior art and have a damping effect by means of a liquid in an annular gap in the event of deflection. In the past, it was not possible to provide a vibration absorber with radially acting hydraulic damping that has satisfactory properties with regard to the adjustability of the damping characteristic, the producibility as well as the service life. In particular, the adjustability of the damping characteristic constitutes a challenge, as do the production and the service life of the vibration absorber.

Therefore, the object of the present invention is to provide a radially acting vibration absorber with improved properties in particular with regard to the adjustability and consistency of the damping characteristic at different amplitudes, good producibility and a long service life.

SUMMARY

According to one aspect of the preset invention a vibration absorber with a radially acting hydraulic damping is provided, which comprises: (i) a bearing core; (ii) a bearing cage radially surrounding the bearing core; (iii) an elastomer body resiliently connecting the bearing core and the bearing cage; and (iv) an outer sleeve radially surrounding the elastomer body for connection to an absorber mass; wherein at least two working chambers filled or to be filled with a fluid are formed in the elastomer body, and wherein the working chambers are fluidically connected to one another by means of a dimensionally stable fluid duct.

A precise adjustment of the damping characteristic of the vibration absorber is advantageously made possible by the position and design of the dimensionally stable fluid duct. In particular, the fluid duct does not deform even at high pressures. Furthermore, it is advantageous that the vibration absorber is simple to produce and has a long service life.

The vibration absorber may be a vibration absorber for use in a vehicle, for example for fitting to a rear axle transmission, rear axle support, sub-frame or chassis component. In particular, the vibration absorber is a single-mass vibration absorber. The vibration absorber is not a bearing, such as for example a chassis bushing, which connects components and should allow defined kinematic movements of the components relative to one another. A vibration absorber is designed for connection to a freely vibrating absorber mass or comprises such a mass, wherein the vibration absorber is firmly connected via an interface, generally the bearing core, to a structure to be damped. "Radially acting hydraulic damping" means that the vibration absorber is designed in such a way that the absorber mass is deflected transversely, i.e. in the radial direction, relative to the bearing core and vibrates, and with this radial vibration movement a hydraulic damping is generated in the vibration absorber. The bearing core is rigidly connected to the structure to be damped, for example by a screw connection.

The bearing core is arranged concentrically with respect to the bearing cage, the outer sleeve and the absorber mass. The bearing core preferably is substantially cylindrical and preferably is formed from a solid material, for example metal, such as steel or aluminum, or plastic. The bearing core may have a centrally arranged axial bore or recess for mounting of the vibration absorber. The bearing core can have, in addition to the axial bore, an axial recess arranged concentrically with respect thereto to receive a screw head of a mounting screw, so that the required installation space for the vibration absorber can be decreased.

The external contour of the bearing cage is likewise preferably substantially cylindrical. The bearing cage may have an annular portion at each of its axial ends, wherein the two annular portions are connected to one another by means of webs. The webs can form the fluid duct supports and/or abutment segment supports, which are described below. The bearing cage is preferably made of a solid material, such as aluminum, steel or plastic. Particularly preferably, the bearing cage is produced from die-cast aluminum. The bearing cage preferably has at each of its axial ends a circumferential sealing lip which projects in the radial direction to ensure improved sealing with the outer sleeve. The sealing lip can be formed in one piece with the elastomer body or may form a part thereof. The bearing cage, the elastomer body and the outer sleeve can have substantially the same axial longitudinal extent. The elastomer body and the bearing cage are preferably connected to one another by vulcanization.

Since the damping is provided hydraulically, the elastomer body can be produced from an elastomer with a low filler content, that is to say with low damping. The elastomer body primarily provides only the spring forces of the vibration absorber. Elastomer mixtures with a low filler content advantageously have a low Payne effect, i.e. low amplitude-dependent changes of rigidity. An elastomer mixture is preferably selected, in which the loss angle of the vibration absorber without hydraulic damping is less than 8°. Furthermore, the elastomer mixture preferably has a low dynamic hardening, for example a hardening factor Kdyn/Kstat of below 1.8. The bearing core and the bearing cage are preferably embedded in the elastomer body. Particularly preferably the elastomer body is overmolded around the bearing core and the bearing cage. The bearing cage is preferably completely embedded in the elastomer body. In particular, the radial outer surface of the bearing cage is completely covered with elastomeric material of the elastomer body. In particular, the radial outer surface of the bearing cage can likewise be completely covered with the elastomeric material of the elastomer body. However, the axial end faces of the bearing core can be at least partially free of elastomeric material.

The elastomer body forms an elastomeric spring between the bearing core and the bearing cage, which spring can absorb radial and axial forces. Furthermore, at least two working chambers which are to be filled with a damping fluid, and are in particular fluid-tight, are formed in the elastomer body. The damping fluid may constitute part of the claimed vibration absorber. The damping fluid may, for example, be glycol. In the axial direction the working chambers are closed by axially offset membranes which are part of the elastomer body. The membranes likewise constitute part of the elastomeric spring. The membranes can extend with a substantially S-shaped or arcuate cross-section from the bearing core to the bearing cage. The radial rigidity of the vibration absorber can be reduced by the S-shaped configuration of the membranes. The radial rigidity of the vibration absorber is increased by the arcuate configuration of the membranes by comparison with the S-shaped configuration.

The fact that the fluid duct is dimensionally stable means that it is designed to be substantially rigid and does not deform even in the event of substantial internal pressures. The dimensional stability of the fluid duct can be achieved, for example, by a suitable choice of material. The fluid duct can be formed in the bearing cage, in the elastomer body and/or in the bearing core. The fluid duct can be produced with any cross-sectional shape.

Furthermore, the vibration absorber preferably comprises a fluid duct segment support which supports the fluid duct.

The fluid duct segment support can support the fluid duct in one direction or in a plurality of directions transversely with respect to the flow direction of the fluid duct between the working chambers. In particular, the fluid duct segment support can support the fluid duct inwards and/or outwards in the radial direction. In this case "support" means that a deformation of the fluid duct due to the action of force is counteracted. Furthermore, the fluid duct segment support can also support the fluid duct in one or in both axial directions. The fluid duct segment support is made of a material which is more rigid and more solid than the material of the elastomer body. The fluid duct segment support can be covered with the material of the elastomer body. The fluid duct segment support can be formed in or on the bearing cage and/or in or on the bearing core. The fluid duct segment support can also be embedded as a separate component in the elastomer body.

Preferably the two working chambers each have at least one radial chamber opening, wherein the two chamber openings are delimited outwards in the radial direction by the outer sleeve, wherein the fluid duct segment support is formed on or in the bearing cage, and wherein the fluid duct segment support supports the fluid duct at least in a radial direction.

In other words, in the radial direction each working chamber has at least one chamber opening, which in the mounted state of the vibration absorber is closed or delimited by the outer sleeve. The working chambers are formed on opposing radial sides of the bearing core, so that by a displacement of the bearing core relative to the bearing cage the volume of one working chamber is reduced and the volume of the other working chamber increases. The elastomer body is preferably formed in such a way that, for a specific displacement direction of the bearing core relative to the bearing cage, the spring rigidity has a minimum value. This direction constitutes the preferred direction of the vibration absorber. The preferred direction is selected so that a displacement of the bearing core in the preferred direction relative to the bearing cage brings about the greatest possible change in volume in the working chambers. The elastomer body is preferably formed in mirror symmetry with regard to the working chamber. Thus, the preferred direction is preferably perpendicular to the plane of symmetry between the two working chambers. Since the bearing core and the bearing cage or the bearing core and the absorber perform vibrating movements relative to one another, the "displacement direction" means a movement axis along which the components move, preferably in an oscillating manner, i.e. back and forth relative to one another.

The fluid duct can be formed radially externally on the bearing cage or on the elastomer body and can extend in the circumferential direction between the two working chambers, that is to say between the chamber openings of the respective working chambers. In other words, the chamber openings of the respective working chambers can be fluidically connected to one another by means of the fluid duct. The fluid duct can be delimited towards the outside in the radial direction by the outer sleeve. It is important that the fluid duct is dimensionally stable or rigid, i.e. its volume does not change under pressure of the damping fluid or due to the movements of the elastomer body. The damping fluid flows or streams from the chamber opening of one working chamber in the circumferential direction along the radial external surface of the bearing cage or of the elastomer body to the chamber opening of the other working chamber. Thus, the fluid duct may be curved along its longitudinal direction. It is also conceivable that the fluid duct extends as a recess or bore through the elastomer body or along the external surface of the bearing core. As the damping fluid flows from one working chamber into the other working chamber via the fluid duct, damping is produced. Therefore, the fluid duct can also be designated as a damping duct. The fluid duct is preferably arranged at a circumferential position on the bearing cage or the elastomer body which is preferably offset by approximately 90° with respect to the preferred direction of the vibration absorber.

The fluid duct is preferably formed as a plateau duct, that is to say it is flat, wide and short, so that the desired damping characteristics of the vibration absorber can be adjusted, i.e. a natural frequency of the hydraulic system is achieved which is higher by comparison with the working range of the vibration absorber. The frequency range which includes the resonant frequency of the vibration absorber, which frequency is dependent upon the absorber mass and the rigidity of the elastomer body, is defined as the working range of the vibration absorber. In particular, the fluid duct can be formed without deflections or the like. For example, the fluid duct can have a height, that is to say an extent in the radial direction, of approximately 1 mm to approximately 3 mm, for example approximately 2 mm. The fluid duct can have a width, that is to say an extent in the axial direction, of approximately 10 mm to approximately 30 mm, for example approximately 20 mm. The length of the fluid duct, that is to say the extent in the circumferential direction, can be approximately 10 mm to approximately 30 mm, for example approximately 20 mm. The bearing cage can have a diameter of approximately 50 mm to approximately 90 mm, for example approximately 70 mm. The axial length of the bearing cage can be approximately 20 mm to approximately 40 mm, for example approximately 30 mm. The dimensions of the elastomer body, which is injection molded around the bearing cage, are only insignificantly greater than the dimensions of the bearing cage. The material thickness of the elastomer body on the outer faces of the bearing cage can be approximately 1.0 mm. The axial length of the outer sleeve corresponds approximately to the axial length of the elastomer body. The outer sleeve can be made of a solid material, such as steel, aluminum or plastic, and can have a material thickness of approximately 0.5 mm to 4 mm. The bearing core can have a diameter of approximately 30 mm to approximately 50 mm, for example approximately 40 mm. The axial length of the bearing core can be approximately 17 mm to approximately 37 mm, for example approximately 27 mm.

Flow elements can be arranged or formed in the fluid duct, in order to adjust the flow behavior of the damping fluid and thus the damping characteristics of the vibration absorber. The flow ducts can be designed as grooves, channels and/or projections, which are formed in the elastomer body and/or in the fluid duct segment support of the bearing cage, and which extend in the circumferential direction and/or axial direction of the elastomer body or the bearing cage.

The outer sleeve can be connected to the absorber mass. The outer sleeve can be made of metal, such as for example steel or aluminum, or of plastic. The outer sleeve can be pushed over the elastomer body for connection to the elastomer body in the axial direction. For fixing the outer sleeve to the elastomer body and for fluid-tight sealing the outer sleeve can be rolled, crimped or flanged. For adjustment of the internal pressure in the closed vibration absorber the external diameter and/or the axial length of the outer sleeve can be calibrated during the mounting. For connection of the outer sleeve to the absorber mass the outer sleeve can be pressed into a correspondingly shaped, preferably cylindrical receiving recess in the absorber mass. The outer sleeve can also be glued, crimped, clamped or welded in the receiving recess of the absorber mass. The receiving recess may be open only on one side, wherein a further centrally arranged mounting bore or mounting recess with a reduced diameter runs axially through the receiving recess, in order to be able to mount the vibration absorber by means of a screw on a structure to be damped. The outer sleeve and the absorber mass can also be formed in one piece or can be produced in a component. In other words, it is possible to dispense with the outer sleeve as a separate component, and the receiving recess of the absorber mass can take over the function of the outer sleeve. The absorber mass can be part of the vibration absorber. An existing component which can freely oscillate, or an additional material component made of metal, for example steel, can be used, for example, as the absorber mass.

The fluid duct segment support supports the fluid duct preferably inwards in the radial direction, i.e. the fluid duct segment support supports the radially inner duct base of the fluid duct. Thus, a dimensionally stable or rigid fluid duct is ensured. The fluid duct can be delimited radially outwards by the outer sleeve, so that the dimensional stability of the fluid duct radially outwards can be ensured by the outer sleeve. The width and length of the fluid xduct segment support corresponds approximately to the width and length of the fluid duct. The fluid duct segment support can have a width, that is to say an extent in the axial direction, of approximately 10 mm to approximately 30 mm, for example approximately 20 mm. The length of the fluid duct segment support, that is to say the extent in the circumferential direction, can be approximately 10 mm to approximately 30 mm, for example approximately 20 mm. In the axial direction, the fluid duct can be supported by the inner faces of the annular portions of the bearing cage. Alternatively, or in addition, the fluid duct can be supported in the axial direction by a beaded outer sleeve.

The fluid duct segment support may be formed continuously, but may also have openings, such as holes and slots. For example, the fluid duct segment support can have a plurality of struts extending in the axial direction in the bearing cage, which together form the fluid duct segment support. The radial outer surface of the fluid duct segment support is preferably covered with elastomeric material of the elastomer body. However, in the region of the fluid duct segment support, the material thickness of the elastomeric material is preferably thin or formed like a skin. In this way a deformation of the fluid duct can be prevented even at high pressures, so that the flow characteristics or damping characteristics can be set particularly well. In the region of the fluid duct segment support the thickness of the elastomeric material can be less than approximately 3 mm. However, in the region of the fluid duct or the fluid duct segment support the radial external surface of the bearing cage may also be substantially free from elastomeric material. Conversely, by a specifically set thickness and shape of the elastomeric material in the region of the fluid duct segment support, a specific deformation can take place at high pressures, in order to for example to break down pulsed pressure peaks.

Preferably, the two working chambers each have two radial chamber openings and the vibration absorber has two fluid ducts, wherein the working chambers are fluidically connected to one another by means of the two fluid ducts, wherein the bearing cage has two fluid duct segment supports, which in each case support one of the fluid ducts in a radial direction, and wherein the fluid ducts are preferably arranged diametrically.

The above explanation with regard to the chamber openings, the fluid duct and the fluid duct segment support applies correspondingly for both fluid ducts and both fluid duct segment supports. In this case "arranged diametrically" means that the fluid ducts are offset by approximately 180° on the outer circumference of the bearing cage or of the elastomer body. Accordingly, the fluid duct segment supports are also preferably arranged diametrically.

The bearing cage preferably has two diametrically arranged abutment segment supports, which each support an abutment region of the elastomer body to the outer sleeve support, wherein the abutment segment supports are arranged offset by approximately 90° with respect to the fluid duct segment support, and wherein the fluid duct segment support is preferably arranged offset radially inwards relative to the abutment segment support.

In particular, the abutment segment supports can be arranged offset by approximately 90° with respect to both fluid duct segment supports, and both fluid duct segment supports can be arranged offset radially inwards relative to the abutment segment supports.

In the abutment regions, the elastomer body substantially abuts the inside surface of the outer sleeve, so that forces can be transmitted particularly well there from the bearing core by means of the elastomer body and the bearing cage to the outer sleeve and to the absorber mass, and vice versa. The abutment regions of the elastomer body can each be arranged between the two chamber openings of a working chamber. The preferred direction of the vibration absorber preferably extends in each case centrally through the abutment regions or abutment segment supports. The longitudinal extent of the abutment segment supports in the circumferential direction of the bearing cage or of the elastomer body can in each case correspond approximately to the longitudinal extent of the abutment regions conform or can be somewhat shorter. The abutment segment supports may be formed continuously, but may also have openings, such as holes and slots. For example, the abutment segment supports can in each case have a plurality of connecting elements extending in the axial direction in the bearing cage, such as for example bar-shaped or rod-shaped struts, which together form an abutment segment support.

In the regions of the abutment segment supports, the material thickness of the elastomeric material of the elastomer body is preferably thin or formed like a skin. As a result, forces can be transmitted particularly well from the bearing core by means of the elastomer body and the bearing cage to the outer sleeve and to the absorber mass, and vice versa. As a result, the vibration characteristics of the vibration absorber can be set by means of the spring rigidity of the connection. In the region of the abutment segment supports the thickness of the elastomeric material can be approximately 0.2 mm to approximately 2 mm, preferably approximately 0.5 mm. The material thickness of the elastomeric material in the region of the fluid duct segment support(s) and in the region of the abutment segment supports can be set to be substantially equal. In this case the fluid duct segment support(s) can be offset radially inwards substantially by the height of the fluid duct. "Offset radially inwards" means that the fluid duct segment support(s) are arranged further inwards in the radial direction compared to the abutment segment supports.

The fluid duct preferably has a ratio of height to width of approximately 1:20 to approximately 1:5, preferably approximately 1:10.

The fluid duct preferably extends along an angular range of approximately 20° to approximately 45°, preferably approximately 35°.

The resonance of the fluid system, i.e. of the hydraulic damping system, is preferably set to over 1.5 times the natural frequency of the absorber.

The resonance of the fluid system or of the hydraulic damping system, that is to say the frequency at which the strongest damping is produced by the damping fluid in the fluid duct or in the fluid ducts, can be set by the configuration of the fluid duct, the type of damping fluid used and/or the static internal pressure of the damping fluid permanently set by calibration of the outer sleeve. In particular, the configuration of the fluid duct is definitive for the resonance of the fluid system, wherein the resonance of the fluid system can be set particularly simply and precisely in the high-frequency range by the flat, wide and short fluid ducts. The natural frequency of the absorber is determined in particular by the spring rigidity of the elastomer body and the vibrating masses, in particular the absorber mass.

Thus the vibration absorber is preferably set in such a way that the frequency of the absolute damping maximum is at least over 1.5 times the natural frequency of the absorber. The natural frequency of the absorber is the natural frequency of the vibration system, which results from the absorber mass and the rigidity of the elastomer body. Thus in the working range of the vibration absorber the damping is used in the pre-progressive range, which is advantageous for the coordination of the vibration absorber. The vibration and damping characteristic of an exemplary vibration absorber is shown in FIG. 11. FIG. 11 shows a graph in which, on the one hand, the dynamic rigidity Cdyn and, on the other hand, the loss angle θ are shown as a function of the excitation frequency. The working range of the vibration absorber lies in the pre-progressive range. Here the vibration absorber differs substantially from a chassis bearing in the form of a hydraulic chassis bushing which is adapted precisely so that the damping maximum at the channel resonance is utilized and wherein a low dynamic rigidity is sought. In a hydraulic chassis bushing, for this purpose the duct is configured to be as long as possible (for example approximately 200 mm) and with a narrow and deep cross-section (for example 4 mm×4 mm), contrary to the fluid duct of the present vibration absorber. The vibration and damping characteristic of a conventional hydraulic chassis bushing is shown in FIG. 12. FIG. 12 shows, similarly to FIG. 11, a graph in which, on the one hand, the dynamic rigidity Cdyn and, on the other hand, the loss angle θ are shown as a function of the excitation frequency. The working range of the chassis bushing lies in the progressive range.

The bearing core and/or the bearing cage has a stop projection, which limits an amount of displacement of the bearing core and the bearing cage relative to one another at least in a radial direction.

Advantageously, the service life of the vibration absorber can be increased in a simple manner by the stop projection, since the strain amplitudes are minimized. Furthermore, as a result the required installation space for the vibration absorber can be reduced. The stop projection projects radially outwards from the bearing core and/or radially inwards from the bearing cage. The stop projection can be configured in block form, and it can be formed in one piece with the bearing core and/or the bearing cage. If the stop projection is formed on the bearing core, it can be formed at least in part continuously or circumferentially along the circumference of the bearing core. The stop projection of the bearing core may be a stop disc. With a certain amount of displacement of the bearing core relative to the bearing cage in the radial direction, the stop projection strikes against a corresponding radial stop surface of the counterpart and thus delimits the relative movement of the bearing core and the bearing cage at least in the radial direction.

Preferably, both the bearing core and also the bearing cage have a stop projection, wherein the respective stop projections are arranged axially offset with respect to one another, in order to limit the amount of relative displacement of the bearing core and the bearing cage in the axial direction.

Advantageously, the service life of the vibration absorber can be further increased by the two stop projections, and also the required installation space for the vibration absorber can be further reduced. The stop projections of the bearing core and the bearing cage overlap at least partially when viewed from the axial direction. With a certain amount of displacement of the bearing core relative to the bearing cage in the axial direction, axial stop surfaces of the stop projection strike against one another in the axial direction and thus limit the relative movement of the bearing core and the bearing cage additionally in the axial direction. The above description relating to the stop projection applies correspondingly to both stop projections of the bearing core and of the bearing cage. Thus, the relative movement of the bearing core and the bearing cage in the radial direction is also limited by at least one of the stop projections. Particularly preferably, the bearing core has two stop projections and the bearing cage has one stop projection, or the bearing core has one stop projection and the bearing cage has two stop projections, the single stop projection being arranged in the axial direction between the two other stop projections. Thus, the relative movement of the bearing core with respect to the bearing cage can be limited in both axial directions, that is to say forwards and backwards. The stops also limit the cardanic deflections of the absorber mass.

The vibration absorber preferably comprises the absorber mass, which is connected to the outer sleeve.

The absorber mass has an axial mounting bore which is smaller in diameter than the diameter of the bearing core.

The axially mounting bore or recess is in particular provided in addition to a receiving recess for receiving the outer sleeve. The mounting bore is preferably formed centrally in the receiving recess and concentrically with respect thereto and enables mounting, in particular screwing, of the vibration absorber on a component by means of a screw. In particular, the mounting bore enables the screw to be inserted through the bearing core and the absorber mass. By the configuration of the bearing core and the absorber mass, that is to say the diameter of the bearing core and of the mounting bore, a secure fastening is provided, since the bearing core does not pass through the mounting bore. In other words, if the bearing core is detached from the elastomer body or the elastomer body tears, the bearing core screwed to the component cannot be completely detached from the rest of the vibration absorber, in particular the absorber mass. Furthermore, by the configuration of the bearing core and the absorber mass an axial stop can be formed, which limits the relative movement of the bearing core with respect to the absorber mass, and thus also with respect to the bearing core, in an axial direction. The axial end face of the bearing core in the region of the circumference of the bearing core and the axial end face of the absorber mass in the region of the circumference of the mounting bore can form the axial stop surfaces.

The center of gravity of the vibration absorber, including the vibration absorber mass, is preferably arranged substantially in the geometric center of the elastomer body.

Advantageously, tumbling movements of the vibration absorber, in particular the absorber mass, are effectively minimized or even avoided by the center of gravity of the entire vibration absorber arranged in the geometric center of the elastomer body. In this way damage to components due to uncontrolled movements of the absorber mass can be avoided and the damping effect during the movement of the absorber mass in the preferred direction can be optimized.

The center of gravity of the vibration absorber is determined by the bearing core, the bearing cage, the elastomer body, the damping fluid and the absorber mass. In a symmetrical elastomer body the geometric center of the elastomer body lies on the central axis of the elastomer body and at mid-height on the elastomer body in the axial direction.

Preferred embodiments of the invention are described in detail below with reference to the appended drawings. It will be understood that the invention is not limited to these preferred embodiments, and that individual features and configurations of the embodiments can be combined freely to produce further embodiments.

DETAILED DESCRIPTION

A first embodiment of the vibration absorber 1 is described in greater detail with reference to FIGS. 1 to 6.

Figure 1:
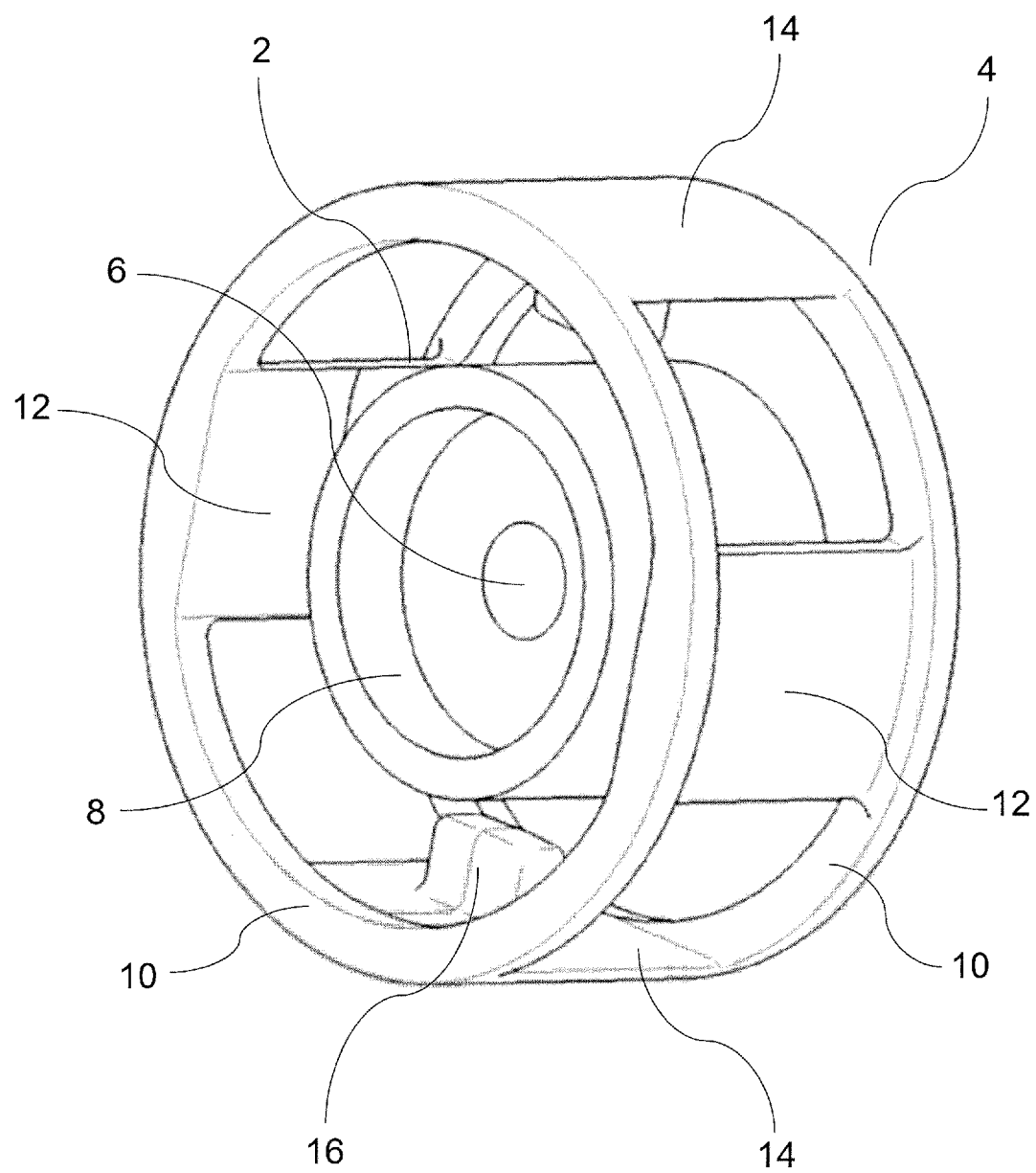
FIG. 1 shows a perspective view of a bearing core and a bearing cage of a vibration absorber according to a first embodiment.
Figure 2:
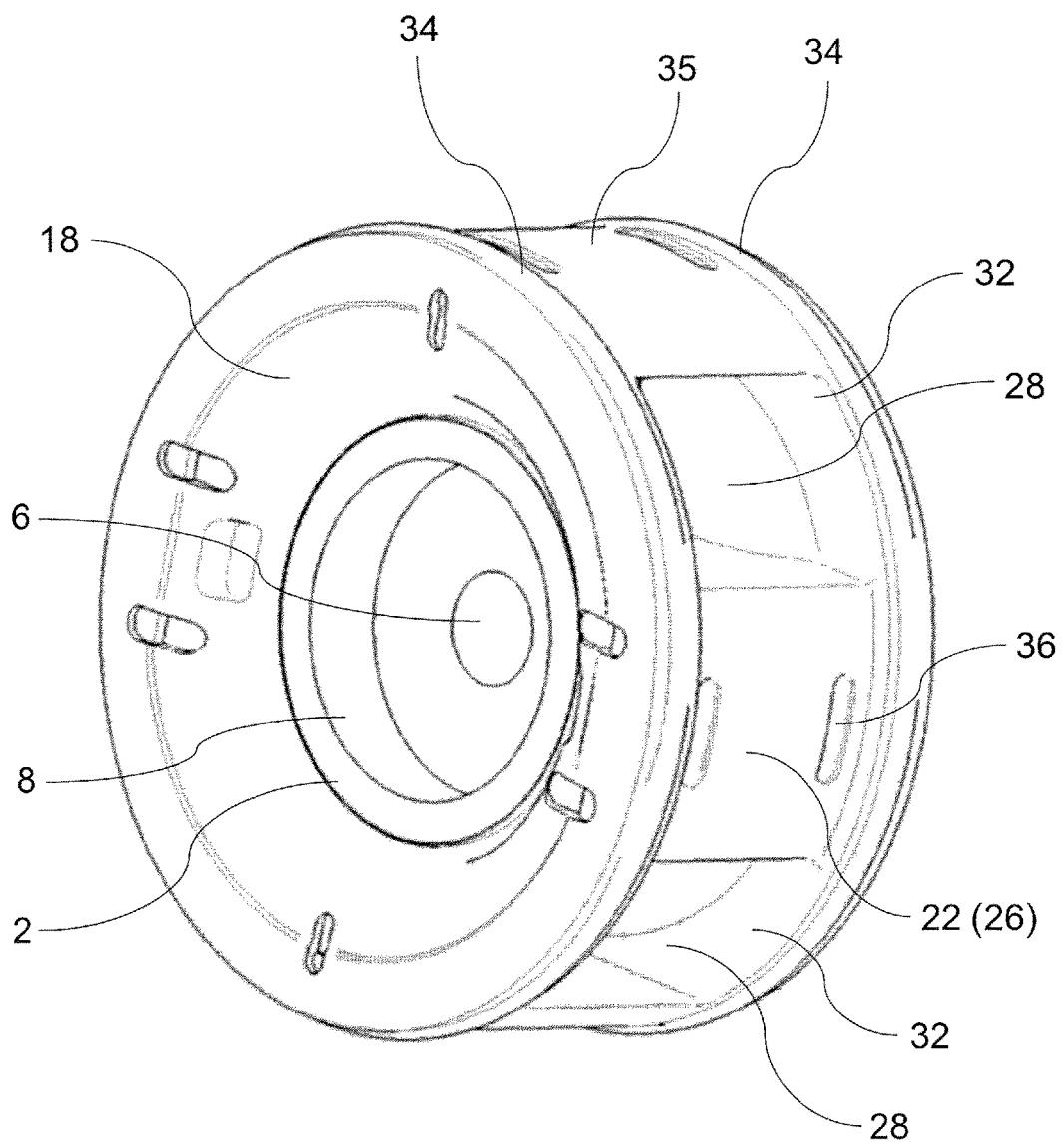
FIG. 2 shows a perspective view of the bearing core and of the bearing cage according to FIG. 1, wherein these are embedded in an elastomer body.
Figure 3:
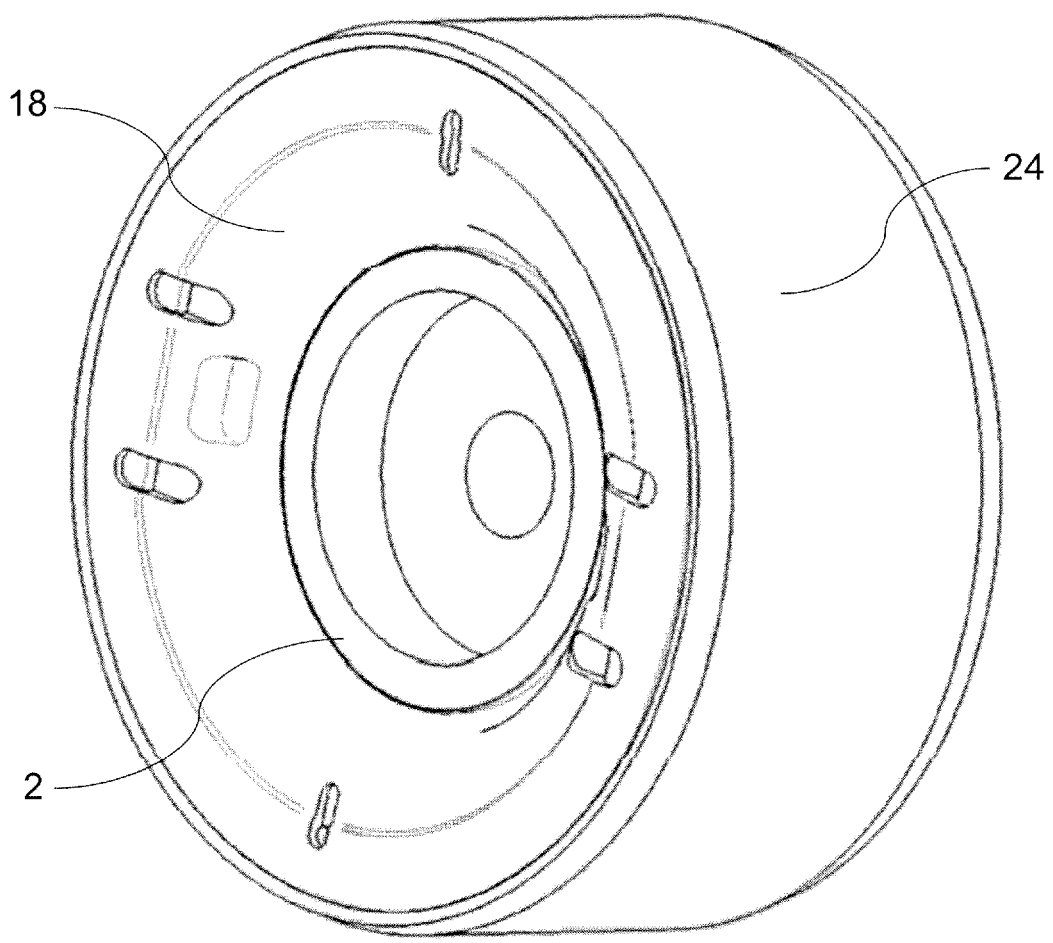
FIG. 3 shows a perspective view of the bearing core, the bearing cage and the elastomer body according to FIG. 2, wherein an outer sleeve is arranged in the elastomer body.

FIG. 1 shows the bearing core 2 and the bearing cage 4 of the vibration absorber 1 of the first embodiment. The bearing core 2 and the bearing cage 4 are arranged concentrically. The bearing core 2 is substantially cylindrical and has an axial bore 6 running through it for passage of a mounting screw. Furthermore, the bearing core 2 has on one axial end a cylindrical recess 8 which is coaxial with respect to the axial bore and can receive the screw head of the mounting screw in order to save installation space and weight.

Figure 4:
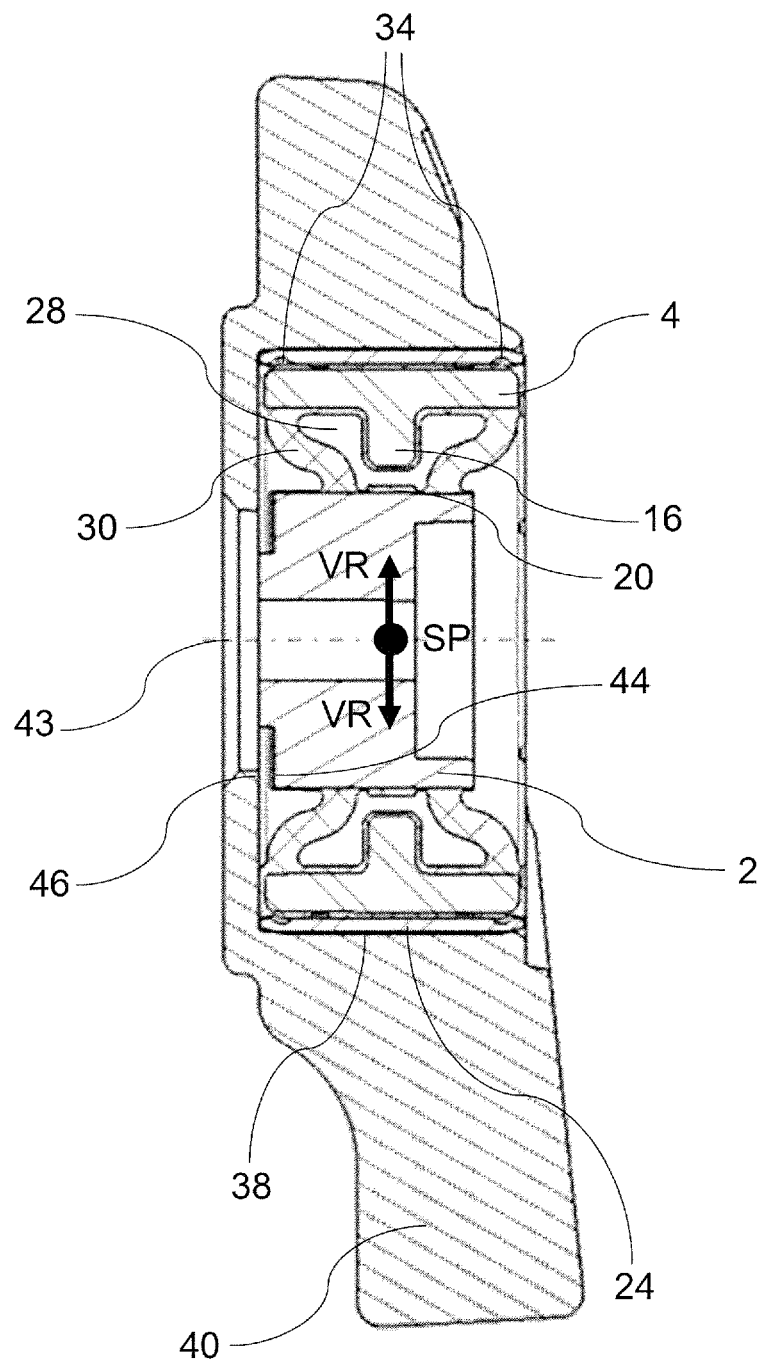
FIG. 4 shows a sectional representation of the vibration absorber of the first embodiment along the central longitudinal axis of the bearing core.
Figure 5:
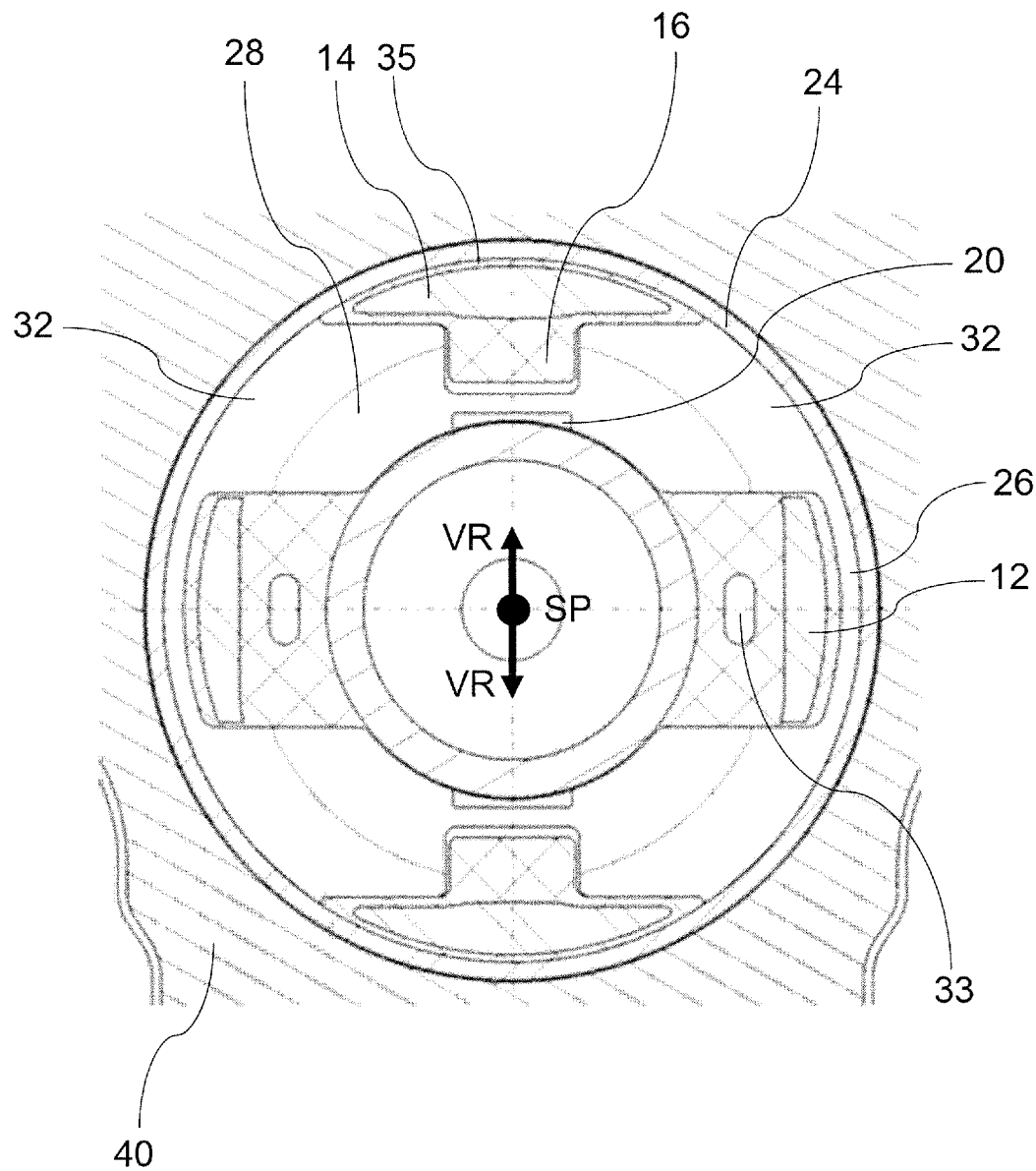
FIG. 5 shows a sectional representation of the vibration absorber of the first embodiment transversely with respect to the longitudinal axis of the bearing core.
Figure 6:
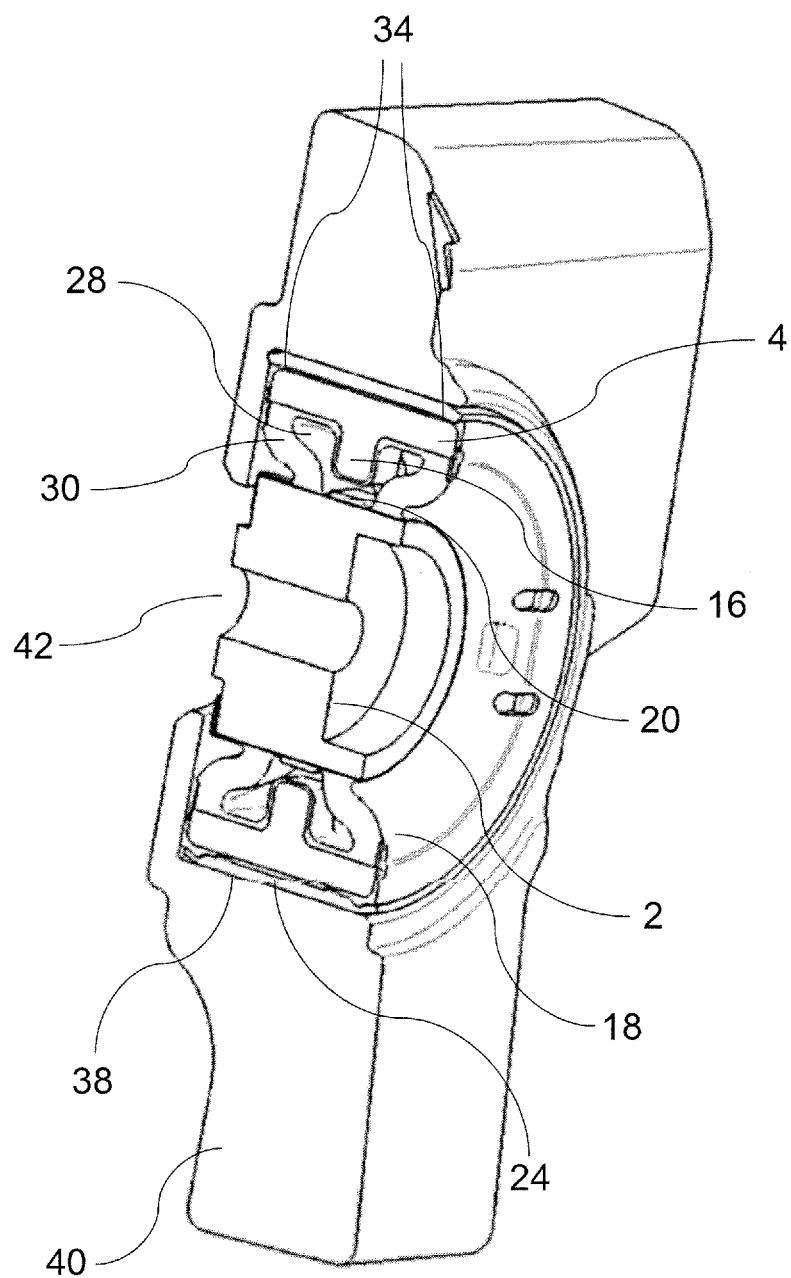
FIG. 6 shows a perspective view of the vibration absorber of the first embodiment, wherein one half of the vibration absorber is hidden.

The bearing cage 4 has at each of its axial ends an annular portion 10, these annular portions being connected to one another by means of four webs offset by 90°. These webs form the segment supports. Two of the webs, which are arranged offset diametrically, that is to say by 180°, form the fluid duct segment supports 12. The two further diametrically arranged webs form the abutment segment supports 14 which are offset by 90° with respect to the fluid duct segment supports 12. The abutment segment supports 14 have on each of their inner faces a centrally arranged, radially inwardly protruding stop projection 16. Even after the overmolding of the elastomer body 18 the stop projections 16 protrude radially inwards, but are covered with an elastomer layer. On the side of the bearing core 2 a substantially planar stop surface 20 is formed by the elastomer body 18 in each case radially inwards of the stop projections 16, as can be seen in FIGS. 4 to 6. The radial displacement of the bearing core 2 relative to the bearing cage 4 in the direction of the abutment segment supports 14 is delimited by the stop projections 16 and the stop surfaces 20.

The abutment segment supports 14 are arranged in such a way that their radial outer faces terminate with the radial outer edges of the annular portions 10. The fluid duct segment supports 12 are arranged offset radially inwards compared to the abutment segment supports 14. In this way a channel 22 is formed on the radially outer surface of the respective fluid duct segment supports 12 between the annular portions 10, and this channel remains even after the overmolding with the elastomer body 18, but is then covered with an elastomer layer. In conjunction with the outer sleeve 24, the channel 22 forms the fluid duct 26.

Between the bearing core 2 and the bearing cage 4 the elastomer body 18 forms two opposing working chambers 28 which are filled with a damping fluid. In the axial direction the working chambers 28 are delimited by membranes 30 of the elastomer body 18 which are curved in an S shape in cross-section (see FIG. 4), in order to obtain a low radial rigidity. In the radial direction, both working chambers 28 each have two chamber openings 32. The chamber openings 32 are in each case formed between an abutment segment support 14 and a fluid duct segment support 12. In other words, the channels 22 or the fluid ducts 26 are in each case arranged between one of the two chamber openings 32 of the two working chambers 28. The stop projections 16 extend in the radial direction into the working chambers 28.

The space between the bearing core 2 and den fluid duct segment supports 12 is substantially completely filled with elastomeric material of the elastomer body 18. As a result, on the one hand, the two working chambers 28 are separated fluidically from one another and, on the other hand, a majority of the spring force of the elastomer body 18 is provided. However, in the regions between the bearing core 2 and the fluid duct segment supports 12, a fixing bore or recess 33 is in each case formed parallel to the central axis of the elastomer body 18, in order to be able to fix the elastomer body 18 during the filling process (see FIG. 4). Furthermore, the spring rigidity in the axial direction and in particular in the radial direction can be set by the configuration of the fixing bore 33. The fixing bore 33 can be closed after the filling process.

The outer sleeve 24 is arranged around the elastomer body 18 or the elastomer body 18 together with the embedded bearing core 2 and the bearing cage 4 is pressed into the outer sleeve 24. In this case the outer sleeve 24 seals the working chambers 28, in particular the chamber openings 32 thereof, as well as the fluid channels 26 in a fluid-tight manner. In order to improve the sealing, radially outwardly projecting circumferential sealing lips 34 made of elastomeric material which are formed in one piece with the elastomer body 18 are arranged at the axial ends of the elastomer body 18 or of the bearing cage 4. The abutment segment supports 14 support the abutment regions 35 of the elastomer body 18 towards the outer sleeve 24. The sealing lips 34 contact the inside surface of the outer sleeve 24 on the axial ends in each case circumferentially along the entire circumference of the elastomer body 18. In the abutment region 35, on the other hand, the elastomer body 18 rests substantially completely on the inner surface of the outer sleeve 24 or the gap between the abutment region 35 and the inner surface of the outer sleeve 24 is so small that in the event of a slight displacement of the bearing core 2 relative to the bearing cage 4 in the direction of the abutment segment support 14 the gap is bridged and the abutment region 35 then rests substantially completely on the inner surface of the outer sleeve 24. The abutment region 35 is in each case supported substantially over the entire length or angular extent from the inside by the corresponding abutment segment support 14 in the radial direction, so that a particularly good transmission of force between the elastomer body 18 and the outer sleeve 24 is guaranteed.

The elastomer body 18 is designed in such a way that the bearing core 2 is preferably displaced radially in the direction of the abutment segment supports 14. In this direction, which may also be designated as the "preferred direction" VR, the elastomer body 18 has the minimum spring rigidity. Due to the radial displacement of the bearing core 2 relative to the bearing cage 4, in particular in the preferred direction VR, the volume of one of the working chambers 28 is decreased and that of the other working chamber is increased, so that the damping fluid flows from the one working chamber 28 via the fluid ducts 26 to the other working chamber 28 and in this case brings about damping. The fluid ducts 26 are formed as plate-like ducts, that is to say flat, wide, short and extending along the outer periphery of the bearing cage 4 or of the fluid duct segment support 12, in order to obtain a good adjustability of the desired damping behavior. The fluid ducts 26 have on their radially inner bases, in particular in the elastomer body 18, in each case two flow elements 36 extending in the peripheral direction in the form of grooves or channels, in order to influence the flow behavior of the damping fluid and to obtain a desired damping behavior of the vibration absorber 1. The fluid ducts 26 are supported radially inwards by the fluid duct segment supports 12, so that a deformation of the fluid ducts 26 is also prevented at high pressures and an improved adjustability of the damping behavior as well as a longer service life of the vibration absorber 1 is guaranteed.

The outer sleeve 24 is arranged in a receiving recess 38 provided therefor in the absorber mass 40 and is fixed there or is pressed into the receiving recess 38. The absorber mass 40 has an axial mounting bore 42 which is arranged concentrically with respect to the receiving recess 38. The mounting bore 42 enables passage of a mounting screw through the bearing core 2 and the absorber mass 40 for mounting the vibration absorber 1 on a component. The diameter of the mounting bore 42 is smaller than the diameter of the bearing core 2, so that secure fastening is provided. Moreover, this configuration provides an axial stop, since in the event of axial displacement of the bearing core 2 relative to the absorber mass 40, and thus also relative to the bearing cage 4 and the outer sleeve 24, in one direction an axial end face 44 of the bearing core 2 abuts the edge 46 of the mounting bore (see FIG. 4). The stop surface of the axial end face 44 of the bearing core 2 is covered with elastomeric material of the elastomer body 18.

The vibration absorber 1 is designed in such a way that the center of gravity SP lies in the geometric center of the elastomer body 18 (see FIGS. 4 and 5). In this way tumbling movements of the vibration absorber 1, in particular the absorber mass 40, can be minimized.

Figure 7:
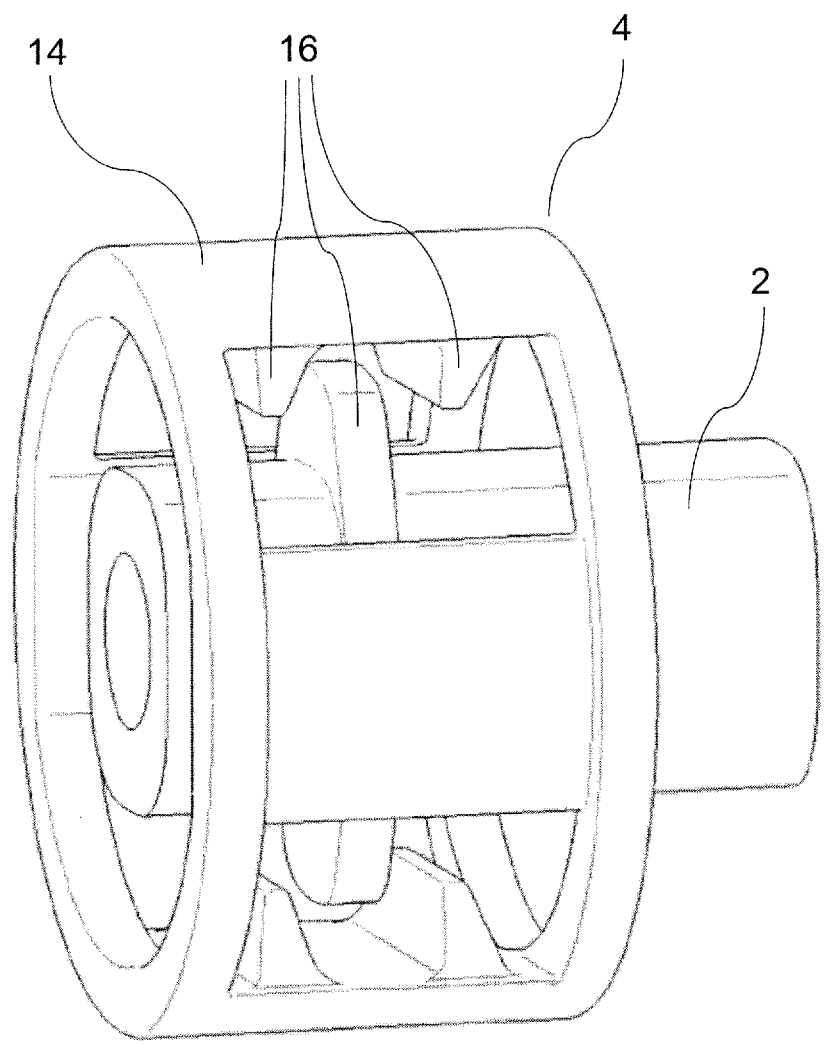
FIG. 7 shows a perspective view of a bearing core and a bearing cage of a vibration absorber according to a second embodiment.
Figure 8:
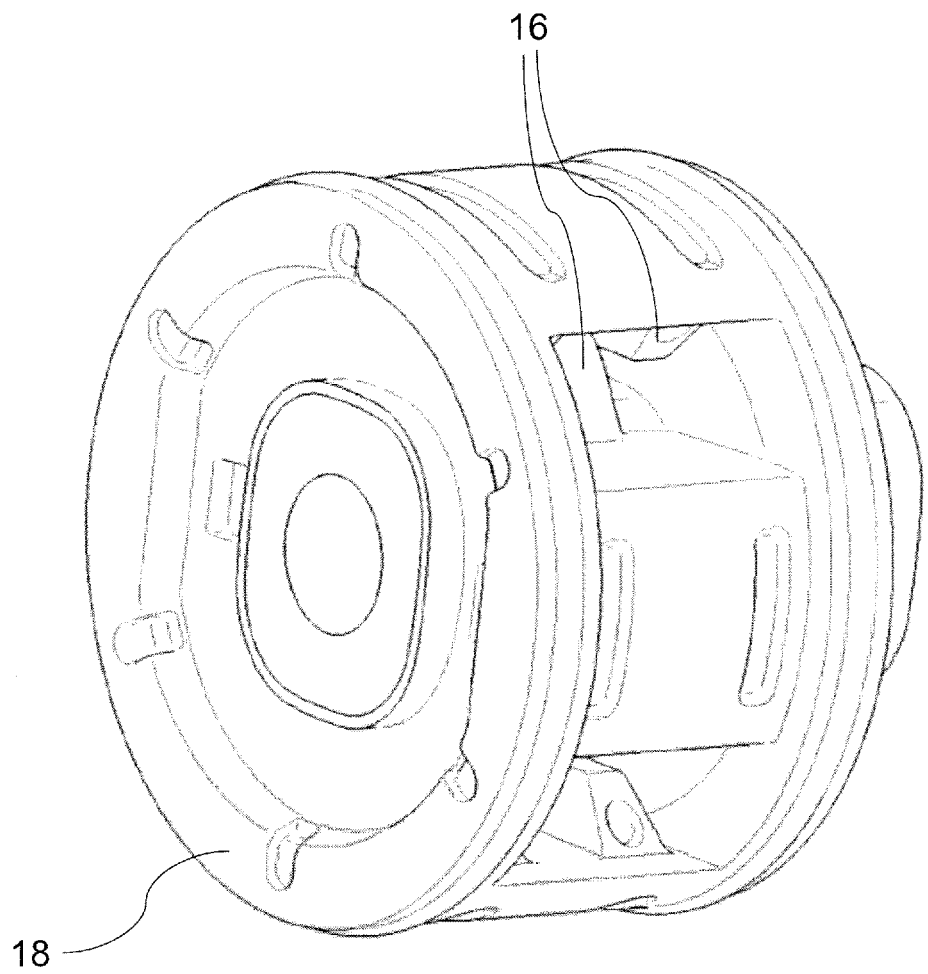
FIG. 8 shows a perspective view of the bearing core and of the bearing cage according to FIG. 7, wherein these are embedded in an elastomer body.

A second embodiment of the vibration absorber 7 is described in greater detail with reference to FIGS. 7 to 9. In the following description of the second embodiment the emphasis is on the features which differ from those of the first embodiment. In the absence of any mention to the contrary, therefore, it may be assumed that the explanations given above for the first embodiment also apply correspondingly to the second embodiment.

The second embodiment differs from the first embodiment first of all in the configuration of the bearing core 2 and of the bearing cage 4. In particular, both abutment segment supports 14 of the bearing cage 4 each have two axially offset radially inwardly protruding stop projections 16, and the bearing core 2 has two diametrically arranged stop projections 16 which in each case project radially outwards in the axial direction between the two stop projections 16 of one of the abutment segment supports 14. The stop projections 16 of the bearing cage 4 and the stop projections 16 of the bearing core 2 overlap when viewed from the axial direction, so that a displacement of the bearing core 2 relative to the bearing cage 4 is limited not only in the radial direction but also in both axial directions. The stop projections 16 of the bearing core 2 can also be configured as a continuous circumferential stop disc.

As a further difference from the first embodiment, the bearing core 2 is longer in the axial direction than the bearing cage 4 and projects on one side or on both sides at the ends of the bearing cage. Although the mounting bore 42 is formed larger than the cylindrical portion of the bearing core 2, it is smaller than the diameter of the bearing core 2 in the region of the stop projections 16 of the bearing core 2. In this way a secure fastening is likewise formed. Furthermore, an end portion of the bearing core 2 can extend through the mounting bore 42. The ratio of the diameter of the end portion of the bearing core 2 and the mounting bore 42 is selected so that, as a result, between the radially outer surface of the bearing core 2 and the radially inner surface of the mounting bore 42 an end portion stop 48 is formed which delimits a movement of the bearing core 2 relative to the absorber mass 40. In particular, not only a relative movement in the radial direction but also a twisting of the bearing core 2 relative to the absorber mass 40 can be effectively prevented by the end portion stop 48.

Figure 9:
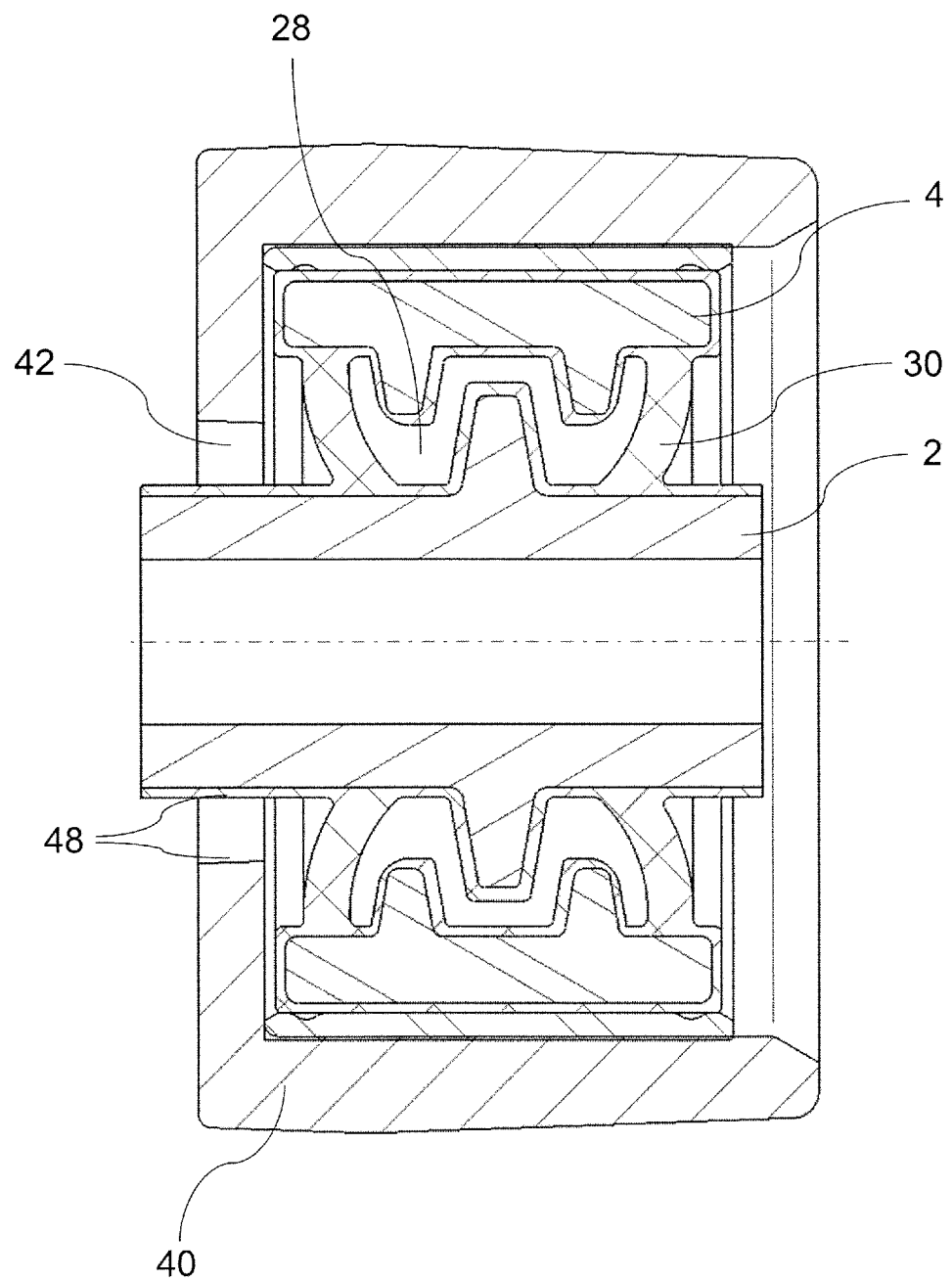
FIG. 9 shows a sectional representation of the vibration absorber of the second embodiment along the central longitudinal axis of the bearing core.

Lastly, the elastomer body 18 of the vibration absorber 1 of the second embodiment differs from the first embodiment in that the membranes 30 which delimit the working chambers 28 have an arcuate configuration (see FIG. 9). Due to the arcuate configuration the spring rigidity can be increased by comparison with an S-shaped configuration. It will be understood that the first embodiment of the vibration absorber can also be combined with the arcuate spring, instead of the S-shaped configuration.

Figures 10A, 10B:
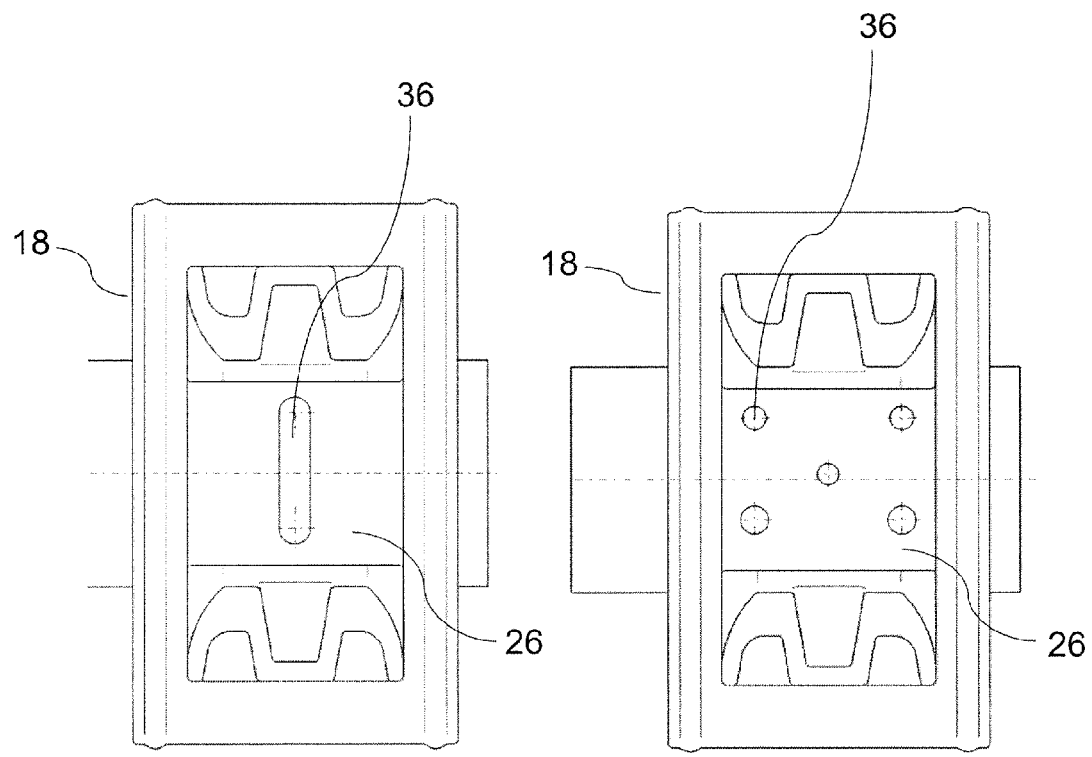
FIGS. 10a and 10b show two modifications of the fluid duct in a side view.
Figure 11:
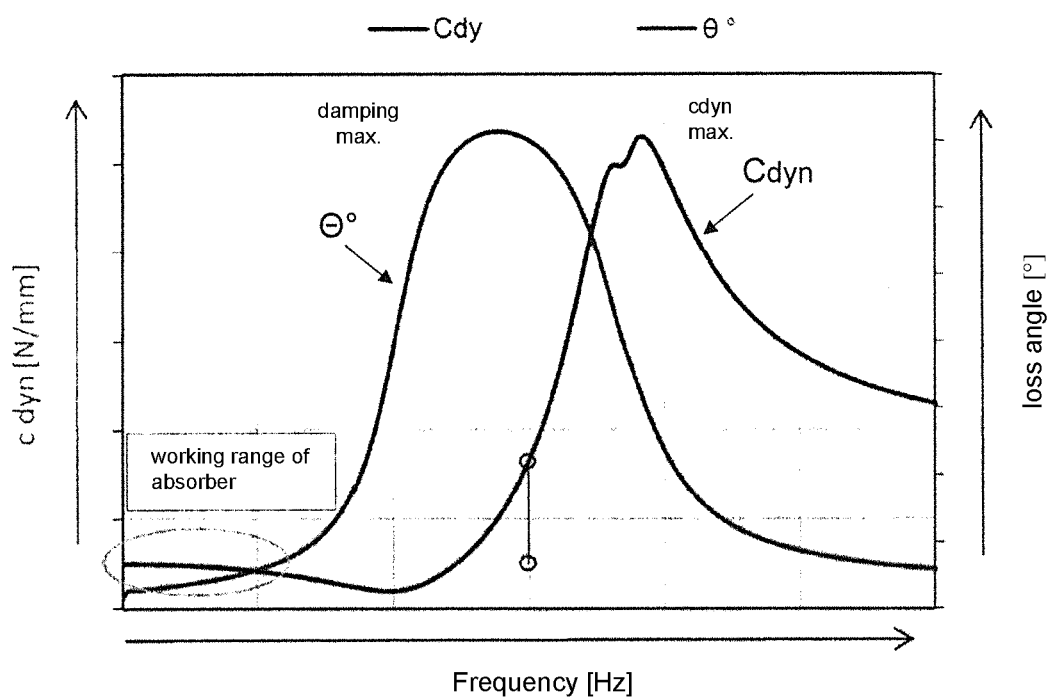
FIG. 11 shows a graph which depicts the vibration and damping characteristic of an example of a vibration absorber.
Figure 12:
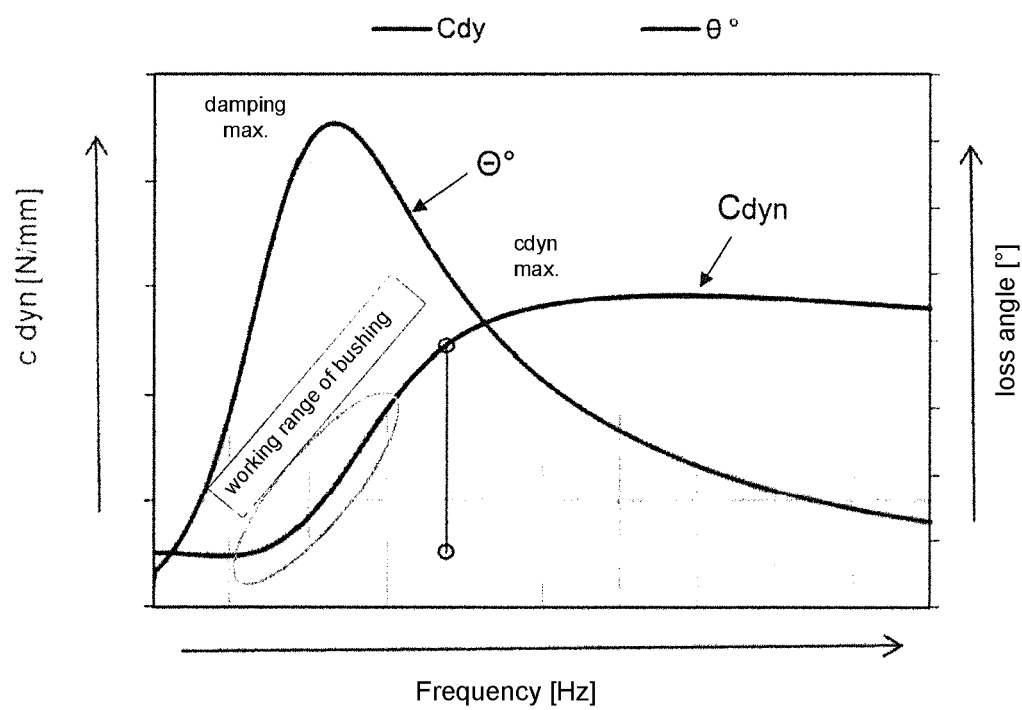
FIG. 12 shows a graph which depicts the vibration and damping characteristic of a conventional hydraulic chassis bushing.

FIG. 10a and FIG. 10b show modifications of the fluid duct 26 of the vibration absorber according to FIG. 9. The fluid ducts 26 in FIG. 10a and FIG. 10b have on their radially inner bases, in particular in the elastomer body 18, in each case two flow elements 36 which influence the flow behavior of the damping fluid and can ensure a desired damping behavior of the vibration absorber 1. The flow element 36 in FIG. 10a is in the form of a single, centrally arranged raised portion extending in the circumferential direction. The flow elements 36 in FIG. 10b are configured as circular raised portions. Four of the flow elements 36 are arranged in the four corner regions of the fluid duct 26, and a flow element 36 is arranged centrally in the fluid duct 26. The diameter and the height of the respective flow elements 36 can varied individually, and also the number and the arrangement of the flow elements 36 can be varied, in order to obtain a desired flow behavior of the damping fluid.

LIST OF REFERENCE SIGNS 1 vibration absorber
2 bearing core
4 bearing cage
6 axial bore
8 recess
10 annular portion
12 fluid duct segment support
14 abutment segment support
16 stop projection
18 elastomer body
20 stop surface
22 channel
24 outer sleeve
26 fluid duct
28 working chamber
30 membrane
32 chamber opening
33 fixing bore
34 sealing lip
35 abutment region
36 flow element
38 receiving recess
40 damper mass
42 mounting bore
44 axial end face of the bearing core
46 edge of the mounting bore
48 end portion stop
VR preferred direction
SP center of gravity of the vibration absorber

What is claimed is:

1. A vibration absorber (1) with radially acting hydraulically damping, comprising:
    a bearing core (2);
    a bearing cage (4) radially surrounding the bearing core (2);
    an elastomer body (18) resiliently connecting the bearing core (2) and the bearing cage (4), at least two working chambers (28) being formed in the elastomer body and being configured to be filled with a damping fluid, the working chambers (28) being connected fluidically to one another by a dimensionally stable fluid duct (26);
    an outer sleeve (24) radially surrounding the elastomer body (18) for connection to an absorber mass (40); and
    at least one fluid duct segment support (12) that supports the fluid duct (26), wherein
    the bearing cage (4) has two diametrically arranged abutment segment supports (14), each of which supports an abutment region (35) of the elastomer body (18) towards the outer sleeve (24),
    the abutment segment supports (14) are offset by approximately 90° with respect to the fluid duct segment supports (12), and
    the fluid duct segment support (12) is offset radially inward relative to the abutment segment supports (14).

2. The vibration absorber (1) of claim 1, wherein the absorber mass (40) is connected to the outer sleeve (24).

3. The vibration absorber (1) of claim 2, wherein the absorber mass (40) has an axial mounting bore (42) that is smaller in diameter than a diameter of the bearing core (2).

4. The vibration absorber (1) of claim 2, wherein the center of gravity (SP) of the vibration absorber (1) is arranged substantially in the geometric center of the elastomer body (18).

5. The vibration absorber (1) of claim 1, wherein
    each of the working chambers (28) has at least one radial chamber opening (32),
    the two chamber openings (32) are delimited towards the outside in the radial direction by the outer sleeve (24),
    the fluid duct segment support (12) is formed on the bearing cage (4), and
    the fluid duct segment support (12) supports the fluid duct (26) at least in a radial direction.

6. The vibration absorber (1) of claim 1, wherein
    each of the two working chambers (28) has two radial chamber openings (32) and the vibration absorber (1) has two of the fluid ducts (26), the working chambers (28) being connected fluidically to one another by means of the two fluid ducts (26),
    the bearing cage (4) has two fluid duct segment supports (12) each of which supports one of the fluid ducts (26) at least in a radial direction, and
    the fluid ducts (26) are arranged diametrically.

7. The vibration absorber (1) of claim 1, wherein the fluid duct (26) has a ratio of height to width of approximately 1:20 to approximately 1:5.

8. The vibration absorber (1) of claim 1, wherein the fluid duct (26) extends along an angular range of approximately 20° to approximately 45°.

9. The vibration absorber (1) of claim 1, wherein a frequency at which a strongest damping is produced by the damping fluid is over 1.5 times the natural frequency of the absorber.

10. The vibration absorber (1) of claim 1, wherein the bearing core (2) and/or the bearing cage (4) has a stop projection (16) that delimits an amount of displacement of the bearing core (2) and the bearing cage (4) relative to one another at least in a radial direction.

11. A vibration absorber (1) with radially acting hydraulically damping, comprising:
 a bearing core (2);
 a bearing cage (4) radially surrounding the bearing core (2);
 an elastomer body (18) resiliently connecting the bearing core (2) and the bearing cage (4), at least two working chambers (28) being formed in the elastomer body and being configured to be filled with a damping fluid, the working chambers (28) being connected fluidically to one another by a dimensionally stable fluid duct (26);
 an outer sleeve (24) radially surrounding the elastomer body (18) for connection to an absorber mass (40); and
 stop projections (16) formed on both the bearing core (2) and the bearing cage (4), and
 the respective stop projections (16) being offset axially with respect to one another to limit an amount of relative displacement of the bearing core (2) and the bearing cage (4) in both axial and radial directions.

12. The vibration absorber (1) of claim 11, further comprising at least one fluid duct segment support (12) that supports the fluid duct.

13. The vibration absorber (1) of claim 12, wherein
 the bearing cage (4) has two diametrically arranged abutment segment supports (14), each of which supports an abutment region (35) of the elastomer body (18) towards the outer sleeve (24),
 the abutment segment supports (14) are offset by approximately 90° with respect to the fluid duct segment supports (12), and
 the fluid duct segment support (12) is offset radially inward relative to the abutment segment supports (14).

* * * * *